US007603325B2

(12) United States Patent
Jacobson

(10) Patent No.: US 7,603,325 B2
(45) Date of Patent: Oct. 13, 2009

(54) CONCURRENT TWO-PHASE COMPLETION GENETIC ALGORITHM SYSTEM AND METHODS

(76) Inventor: David L. Jacobson, 10409 Adel Rd., Oakton, VA (US) 22124

( * ) Notice: Subject to any disclaimer, the term of this patent is extended or adjusted under 35 U.S.C. 154(b) by 478 days.

(21) Appl. No.: 11/100,968

(22) Filed: Apr. 7, 2005

(65) Prior Publication Data

US 2006/0229817 A1  Oct. 12, 2006

(51) Int. Cl.
*G06N 3/00* (2006.01)
*G06F 19/00* (2006.01)
(52) U.S. Cl. .......................................... 706/13; 702/19
(58) Field of Classification Search ....................... None
See application file for complete search history.

(56) References Cited

U.S. PATENT DOCUMENTS

| 6,505,180 | B1 | 1/2003 | Crowley |
| 6,513,024 | B1 | 1/2003 | Li |
| 6,523,016 | B1 | 2/2003 | Michalski |
| 6,578,176 | B1 | 6/2003 | Wang |
| 6,627,900 | B2 | 9/2003 | Fukui |
| 6,766,497 | B2 | 7/2004 | Anderson |
| 6,807,491 | B2 | 10/2004 | Pavlovic et al. |
| 2003/0140024 | A1 * | 7/2003 | Crowley ...................... 706/47 |

OTHER PUBLICATIONS

Srivastava et al. (1997) Integrated Computer Aided Engineering. "Generalized Distributed Genetic Algorithm for Optimization Problems", vol. 4, pp. 276-289.*
Cobb, Helen G., An Investigation into the Use of Hypermutation as an Adaptive Operator. . . (Dec. 11, 1990).
Bhargava, Heman & Jacobson, David, Genetic Storms: Investigating the Gulf War Syndrome, Proceedings of the 30th Annual Hawaii Intl. Conference on Systems Sciences (1997).
Goldberg, David E., Genetic Algorithms in Search Optimization & Machine Learning, pp. 147-161 (Addison Wesley 1989).
Goldberg, David E., The Design of Innovation, Lessions from and for Competent Genetic Algorithms, pp. 187-209 (Kluwer 2002).
Rowe, Jonathan E., A Normed Space of Genetic Operators with Applications to Scalability Issues, Journal of Evolutionary Computation 9(1): 25-42 (MIT 2001).
Chen, Genetic Algorithms and Genetic Programming in Computational Finance, 2002, Kluwer Academic Publishers.
Antenna Design by Genetic Algorithms, 2008, Navy STTR FY2008A—Topic N08-T031.
Emera & Sarma, Use of Genetic Algorithm to Estimate CO2-Oil Minimum Miscibility Pressure—a key parameter in design of CO2 miscible flood, 2005, J. Petroleum in Sci. and Eng. vol. 46, Issues 1-2, pp. 37-52.
Brinkman, Genetic Algorithms and Their Application to the Protein Folding Problem, 1993 (masters thesis), AF Inst. of Tech. Wright-Patterson AFB, Ohio School of Engineering.
Karr & Freeman, Industrial Applications of Genetic Algorithms, 1998, CRC Press Int. Series on Computational Intelligence.
Kelner & Leonard, Application of Genetic Algorithms to Lubricate Pump Stacking Design, 2004, J. Computational and Applied Mathematics, vol. 168, Issues 1-2, pp. 255-265.
Rauwolf & Coverstone-Carroll, Near-Optimimal Low-Thrust Orbit Transfers Generated by a Genetic Algorithm, 1996, J. of Spacecraft and Rockets, vol. 33, No. 6.
Looze, Logan, Sandell & Leblanc, A Decision Aid for Theater Missile Defense, 1997, IEEE Int. Conf. on Evolutionary Computation, pp. 563-568.

* cited by examiner

*Primary Examiner*—Lori A Clow
(74) *Attorney, Agent, or Firm*—NewTechLaw; Gerald B. Rosenberg, Esq.

(57) ABSTRACT

A genetic algorithm architecture implements a two-stage completion genetic algorithm with respect to an evolving current population data set. The two-stage completion genetic algorithm that includes genotype and phenotype completion loops. The genotype completion loop operates to compete the current population data set based on genotype field fitness scores. The genotype completion loop also implements a phenogenesis operator used to generate a current phenotype set. The phenotype completion loop operates, concurrently with the genotype completion loop, to evaluate the current phenotype set, constrained relative to the current population data set, against a fitness function to produce phenotype fitness scores. The phenotype completion loop implements a genotype reduction operator that then determines corresponding genotype fitness scores for use as the basis for competition in the genotype completion loop.

9 Claims, 4 Drawing Sheets

CONCURRENT TWO-PHASE COMPLETION GENETIC ALGORITHM SYSTEM AND METHODS

BACKGROUND OF THE INVENTION

1. Field of the Invention

The present invention is generally related to systems and methods implementing computationally and data set intensive genetic algorithms and, in particular, to a computationally efficient genetic algorithm capable of processing substantially sized populations.

2. Description of the Related Art

Genetic algorithms (GAs) are increasingly if not already widely used to solve a variety of computational problems that are of a scale that are not readily solvable, at least as a practical matter. Such problems typically occur in the field of multi-variate analysis as applied to, for example, discovering complex drug interactions in massed clinical trial data and trend-spotting in broad-based, high-volume economic data. Alternate known methods, such as stochastic and bivariate analysis methods, will tend towards identifying localized, rather than optimal solutions. In many cases, the data sets are so large and the cross-correlations between variate fields too uncertain to practically consider application of any conventional methodology other than those based on genetic algorithms.

There are, however, a number of known limitations in current implementations of conventional genetic algorithms. These limitations are particularly significant in that they directly constrain the number of variate data fields that can be considered simultaneously, the size of the data population that can be processed, and the overall throughput of the computer systems implementing the genetic algorithms.

A known limitation of conventional genetic algorithms is frequently described as convergence or selection pressure stall. Where the population is large in relation to the variation of parameters of interest, conventional genetic algorithms will encounter difficulties in reliably distinguishing variations of significance. The genetic algorithm will tend to overly focus on insignificant distinctions in the population data set and fail to make meaningful progress towards identifying a population-wide optimal solution. In effect, the genetic algorithm will prematurely identify and hold to a nearly arbitrary local maximum as a final problem solution. Although stalling can occur with any population size whenever the data set features of interest are nearly homogenous, the stalling phenomenon is most significantly encountered whenever a conventional genetic algorithm is applied to any overly large population data set. Real world applications unfortunately tend to require analysis of extremely large populations and correspondingly large population data sets. Subdivision of the population for purposes of GA analysis results in the loss of significant information in the form of unanalyzed cross-correlations between the subpopulations. Therefore, conventional GA implementations will require many independent GA runs over arbitrarily cross-cut subpopulations and a statistical analysis of the resulting family of potentially optimal solutions. This approach is very time consuming and does not preclude the loss of epistasis or other cross-correlation dependent information among the subpopulations.

Another limitation of conventional genetic algorithms is a fundamental difficulty in scaling computer implementations to concurrently process larger population data sets or to increase the throughput processing of a given population data set. As a practical matter, genetic algorithms progressively carry forward knowledge about potential optimal solutions to a problem in the evolving composition of the population data being processed. While an effective mechanism for storing the knowledge in an efficiently processable manner, there is little ability to share the knowledge in a manner that does not fundamentally disrupt the operation of the GA or loose significant information.

A conventional approach to performance scaling relies on a shared population data space, in effect a shared memory representation of the current population data set, accessible by multiple GA processors. The data and computationally intensive nature of GAs, however, typically results in significant contention for memory access. The intended benefits of parallelization are substantially lost. Alternately, full parallel processing architectures are used, though with the necessity of subdividing the population data set. As before, population subdivision inherently results in the undesirable loss of cross-correlation information.

Relatively recent developments in GA theory, specifically the advancement of competent genetic algorithms, have produced substantial performance improvements by evolving the implementation of qualified linkage learning. A linkage learning GA attempts to concurrently perform genetic pattern search and allele or attribute evaluation. Competency imposes a necessary constraint that pattern search complete first. One approach to delaying final attribute selection involves a complex, cyclic chromosomal system used to implement a probabilistic expression and preservation of attributes that would otherwise be eliminated under normal competition. Preserved attributes are expressed in probabilistically determined locations, resulting in reordered chromosomal patterns. The reordering function thus permits linkages between fields to be effectively searched with the most fit linkages being retained through competition.

GA systems modeled on cyclic chromosomes coupled with probabilistic expression operators represent, at best, artificial genetic systems. While such artificial systems have been experimentally validated against known population sets, including population sets seeded with known problematic data patterns, the algorithms largely exist without a guiding biological model. Current GA theory may not yet be adequate to permit reliance on such artificial algorithms, or at least determine the degrees of uncertainty, when analyzing real population data sets for practical ends.

Still another known limitation of conventional genetic algorithms is the deficient recapture of knowledge through use of the mutation operator. The fundamental operation of the selection and cross-over GA operators serve to drive innovation, or knowledge discovery. Even using a probabilistic expression or equivalent operator that tends to preserve attribute value knowledge, knowledge potentially significant to a final optimal solution can be prematurely lost from the current population data set through the progression of competition. Excessive knowledge loss, typically arising from use of an overly aggressive cross-over rate, leads to GA instability.

To maintain stability, standard GA mutation operators are used to progressively prompt the rediscovery of potentially prior lost knowledge. The mutation rate must be sufficient to assure that any prematurely lost fields and values are reintroduced into a current population data set to permit inclusion, as appropriate, into the eventual optimal solution data set. Single point mutations, as represented by a single instance of a field, are rather inefficient at reintroducing lost knowledge. The likelihood that a single point mutation will survive and propagate sufficient to affect the eventual optimal solution is rather low. Mutation rates must therefore be sufficient not only to reintroduce single instances of fields, but of sufficient instances to present a sufficient variety of values that may be determined significant in the determination of fitness and thus participate in the final optimal data set.

Conventionally, the GA cross-over rate, set high enough to achieve the desired innovation, must be suitably balanced by the mutation rate to maintain stability. Conversely, the mutation rate, desirably set higher to assure an adequate recapture of lost knowledge before closure, cannot be set too high due to the generally randomizing effect of mutation on convergence. Thus, conventional cross-over and mutation rates are limited, thereby limiting the rate of convergence on a reliably obtained optimal solution as a practical matter, in significant part due to the limited knowledge recapture possible through single-point mutations.

Consequently, there is a clear need for an improved GA system capable of handling large, high-order multi-variate populations, achieve high-throughput, facilitate parallelization, and ensure the effective retention and recapture of relevant knowledge throughout the GA processing cycles.

SUMMARY OF THE INVENTION

Thus, a general purpose of the present invention is to provide an efficient, high-performance, parallelizable genetic algorithm implemented in a computer system and methods of operating the system.

This is achieved in the present invention by providing a genetic algorithm architecture that implements a two-stage completion genetic algorithm with respect to an evolving current population data set. The two-stage completion genetic algorithm that includes selectively interdependent genotype and phenotype completion loops. The genotype completion loop operates to compete the current population data set based on genotype field fitness scores. The genotype completion loop also implements a phenogenesis operator used to generate a current phenotype set representative of the genotypes within the current population data set. The phenotype completion loop operates, concurrently with the genotype completion loop, to evaluate the current phenotype set against a fitness function to produce phenotype fitness scores. The phenotype completion loop implements a genotype reduction operator that then determines corresponding genotype fitness scores that are used as the basis for competition in the genotype completion loop.

An advantage of the present invention is that the genetic algorithm system architecture incorporates a two-stage genetic completion against phenotypes and genotypes resolved against the population data set. With two-stage genetic completion, a far larger number of variate fields and correspondingly larger population data set size can be efficiently processed without selection pressure stall than in any conventional genetic algorithm system.

Another advantage of the present invention is that the architecture directly supports GA processor parallelization without degrading the performance or impacting the ongoing operational accuracy of any individual GA processor. Hardware parallel performance scales nearly linearly, limited principally by the performance and capacity of a database cache, while total GA performance scales as a nearly exponential function of the combined GA search space processed by the parallel GA processors. Although preferred, hardware cache writes need not be strictly serialized against cache reads, resulting in the substantial removal of cache performance as a constraint on the scalability of a GA processor array. Cache size is effectively non-limiting when sufficient to store a compact representation of the current generation of the population data set being processed by the GA processor array.

A further advantage of the present invention is that the architecture implements an automatic, auto-adjusting linkage learning function allowing concurrent pattern and attribute search. Using the two-stage genetic completion GA architecture, genotype and phenotype analysis proceed concurrently with the result that, as genotype-based pattern search converges, the GA architecture automatically increases the deterministic significance of the phenotype-based attribute search in converging towards a final optimal solution.

Still another advantage of the present invention is that the architecture supports a lossless knowledge recovery mutation operator. The architecture implements a persistent rulebase that enables the immediate recovery of the full past knowledge value of the field and associated phenotypes restored by mutation. Consequently, mutation restored knowledge propagates based on a multipoint mutation recovery representing accumulated competitive significance, rather than as just a novel single point mutation. Lower mutation rates can be used while attaining equal if not substantially improved GA performance due to lossless knowledge recovery.

DETAILED DESCRIPTION OF THE INVENTION

Figure 1:
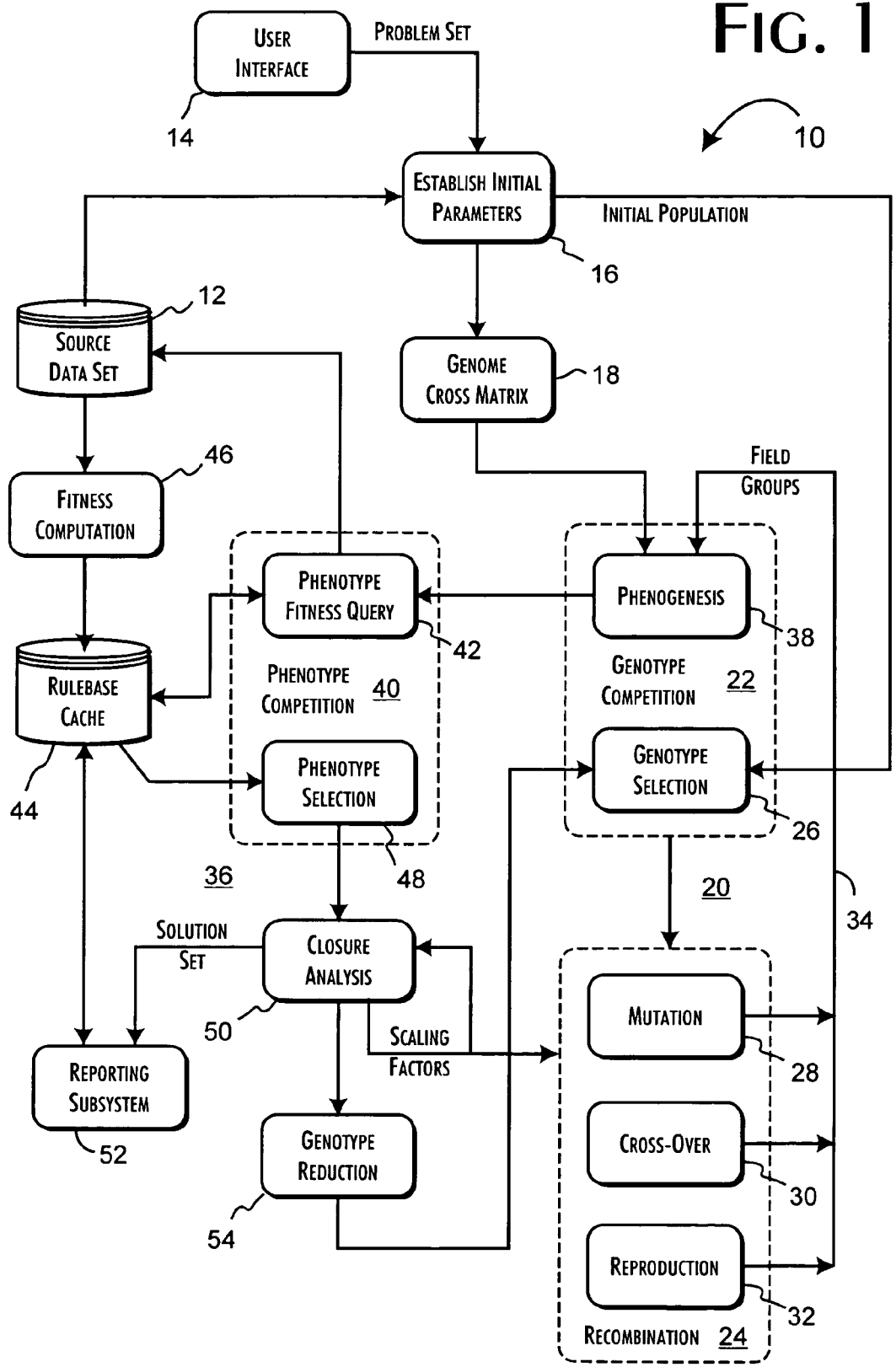
FIG. 1 is an architectural block diagram of a preferred computer-based, genetic algorithm implementation of the present invention.

The present invention provides a highly effective, scalable, computer implemented genetic algorithm that is capable of reliably processing multi-variate fields and population sizes that are well suited to practical application and well beyond the comparable limits of conventional genetic algorithm implementations. In the following detailed description of the preferred embodiments of the present invention, like reference numerals are used to designate like parts depicted in one or more of the figures.

The present invention is applicable, in general, wherever a genetic algorithm may be used to analyze a population data set for the identification of an optimal solution set. In terms of the present invention, a population data set is composed of individuals having variate characteristics or fields that collectively define the genome of the population. Each individual within the population is represented by a set of fields, which may be a subset of the genome fields, that define the genotype of the individual. Individuals may have different genotypes. A genome field, and equivalently a genotype field, can contain a field-type dependent number of different possible values. A binary field can store $2^n$ values, where n is the bit width of the field. Real number fields will store a numeric precision dependent number of values. Other field types can include enumerations and integers. The particular value stored by a field is the attribute of the field. The phenotype of an individual is determined by the specific attributes of the genotype fields for that individual.

As is known, a genetic algorithm does not produce a specific answer to a problem, but rather operates to identify an optimal subset of the given population that best fits the established GA analysis model. In accordance with the present invention, discerning an optimal solution set for a GA problem involves the integral and concurrent determination of a best fit set of genotypes and, for that set of genotypes, a best fit set of phenotypes. The present invention implements this linkage learning, effectively discerning optimal genotype patterns and phenotype attributes, in a concurrently interoperating two-stage completion genetic algorithm architecture.

A preferred embodiment of the genetic algorithm architecture 10 of the present invention is shown in FIG. 1. The architecture 10 may be implemented in a general purpose computer system ranging in specification from industry standard personal computers to mainframes. A source population data set is typically provided in a source database 12. A user interface 14 permits a number of different analysis parameters to be selected 16, including an initial population data set for analysis, specifically, the set of genotypes representing an initial population data set, a phenotype size factors, used to control the generation of a hypothetical phenotype population data set, initial mutation, cross-over, and scaling rates, and others that will be discussed below.

Based on the source population data set, a genome cross-matrix table 18 is established. The table 18 preferably stores the attributes that exist within the population data set indexed by field. Preferably, the table 18 also provides a random attribute selector that will return a number of actual attribute values for a given field, where the number is defined by the hypothetical phenotype size factor parameter.

A first stage genotype completion loop 20 includes genotype competition 22 and recombination 24 processes operating on sets of field groups representing the genotypes of the current generation of the population under analysis. The genotype competition process 22 preferably implements a genotype selection operator 26 that allocates selected field groups for mutation, cross-over, and reproduction. The recombination process 24 preferably implements GA mutation 28, cross-over 30, and reproduction 32 operators that together produce a next generation of field groups 34.

The genotype selection operator 26 relies on field group fitness scores that are generated in a second stage phenotype completion loop 36. In accordance with the present invention, each iteration of the phenotype completion loop 36 is presented with a hypothetical phenotype population probabilistically produced by the genotype completion loop 20. A phenogenesis operator 38, present as an active component of the genotype competition process 22, produces a current hypothetical phenotype population based on the set of current field groups 34. For each field group, representing a genotype, the phenogenesis operator 38 produces a corresponding set of phenotypes where the values of each field are obtained from the genome cross-matrix table 18. The number of phenotypes generated for each genotype is determined by the hypothetical phenotype size factor parameter.

The hypothetical phenotype population is provided to a phenotype competition operator 40. This current hypothetical phenotype population coupled with a selectively retained history of prior hypothetical phenotype populations is used by the phenotype competition operator 40 to substantially determine the field group fitness scores for the genotypes represented in the current hypothetical phenotype population. A phenotype fitness query operator 42 evaluates each generated phenotype to determine a corresponding phenotype fitness score, constrained to those phenotypes that exist within the actual source population data set. A rulebase cache 44 is used to store previously evaluated phenotypes and corresponding fitness scores. Where a generated phenotype is not present in the rulebase cache 44, the source database 12 is tested to determine whether the generated phenotype exists within the source population data set. If found, the phenotype is then processed through a fitness computation process 46 that implements the genetic algorithm fitness model. Preferably, the fitness computation process 46 implements the model using a conventional GA clustering, positive prediction value (PPV), Bayesian p-value, or Chi-square discrimination algorithm with the result of producing a fitness score for the processed phenotype. The processed phenotype and determined fitness score are then stored to the rulebase cache 44.

Given that the fitness computation process 46 is computationally intensive, storing phenotype and fitness rules to the rulebase cache 44 efficiently eliminates repeated fitness calculations typical of conventional GA algorithms that, as a practical matter, substantially limit the size of population data sets that can be analyzed using conventional GA algorithms. In contrast, the computational intensity of the fitness calculations acts as a practical limitation, in the context of the present genetic algorithm architecture 10, only on the phenotype size factor. In preferred embodiments of the present invention, phenotype size factors in the range of 20 to 2,000 can be readily used given only a high-end personal computer level platform. Larger size factors, reaching upwards of 20,000 or greater, can be accommodated on workstation-class and larger computer systems. Using larger phenotype size factors effectively increases the rate of search over the phenotypes within the source population data set.

The set of phenotype rules determined for a hypothetical phenotype population are returned to complete phenotype competition 40. A phenotype selection operator 48 preferably implements a truncation function to select, based on phenotype fitness scores, the top N phenotypes for each different genotype represented in the set of phenotype rules. The value of N is preferably set initially as one of the analysis parameters 16. While other GA selection algorithms may be used, the truncation function is currently preferred for computational simplicity. Each genotype is then assigned a genotype fitness score based, in the preferred embodiments, on the average of the corresponding top N phenotype scores. Alternately, the assigned genotype fitness scores may be determined based on computed mean, standard deviation, or other distribution analysis function.

A closure analysis operator 50 is provided to determine whether an optimal phenotype solution set has been discovered in the processing of the current population data set. A number of different criteria can be considered in determining closure, including the number of generations processed through the genetic algorithm architecture 10, the diversity of the current population data set, and the inter-generational variance in the sets of phenotype rules considered by the phenotype selection operator 48, including particularly those identified by the truncation function.

The closure analysis operator 50 also preferably generates a number of scaling factors used to tune the sensitivity of the genetic algorithm architecture 10 to the genotype and phenotype fitness scores determined for current population data sets. These scaling factors preferably include a phenotype fitness amplification factor, a mutation rate factor, and a cross-over rate factor. In particular, the phenotype fitness amplification factor is preferably a logarithmic multiplier applied to the phenotype fitness scores to maintain the scores well distributed over a predefined range, thereby enhancing distinctiveness for the benefit of the phenotype selection operator 48. In preferred embodiments of the present invention, exponent values progressively varying in the range of from −1.5 to +1.5 are typically used. As will be further explained below, the genetic algorithm architecture 10 is able to quickly progress towards convergence without requiring excessive or even substantial mutation rates. Consequently, the genetic algorithm architecture 10 is able to use higher amplification factors, that in turn reduce the possibility of premature convergence, without loss of stability.

Closure is concluded where the generation iterations exceed a preset analysis parameter 16 or reach threshold diversity or variance limits also defined by analysis parameters 16. An identification of the current phenotype population, representing a potential optimal solution set, is provided to a reporting subsystem 52. The full set of accumulated phenotype rules stored by the rulebase cache 44 is preferably also available to provide an expanded and historical basis for determining a final optimal solution set.

A genotype reduction operator 54 is provided to reduce the selected set of phenotype rules, as found by the phenotype selection operator 48, to a corresponding set of genotypes and genotype fitness scores. These genotype rules are provided to the genotype selection operator 26. The genotype fitness scores are used in a GA selection algorithm to determine the destiny of the individual field groups represented by the genotypes. In the preferred embodiments of the present invention, a GA proportional selection algorithm is used. While conventionally discouraged due to a greater sensitivity to population pressure, proportional selection is desirable for increased noise immunity and a tendency to converge quicker than achievable using other selection operators. The increased immunity to population pressure stall otherwise afforded by the genetic algorithm architecture 10 therefore enables effective use of proportional selection in implementations of the present invention.

Figure 2:
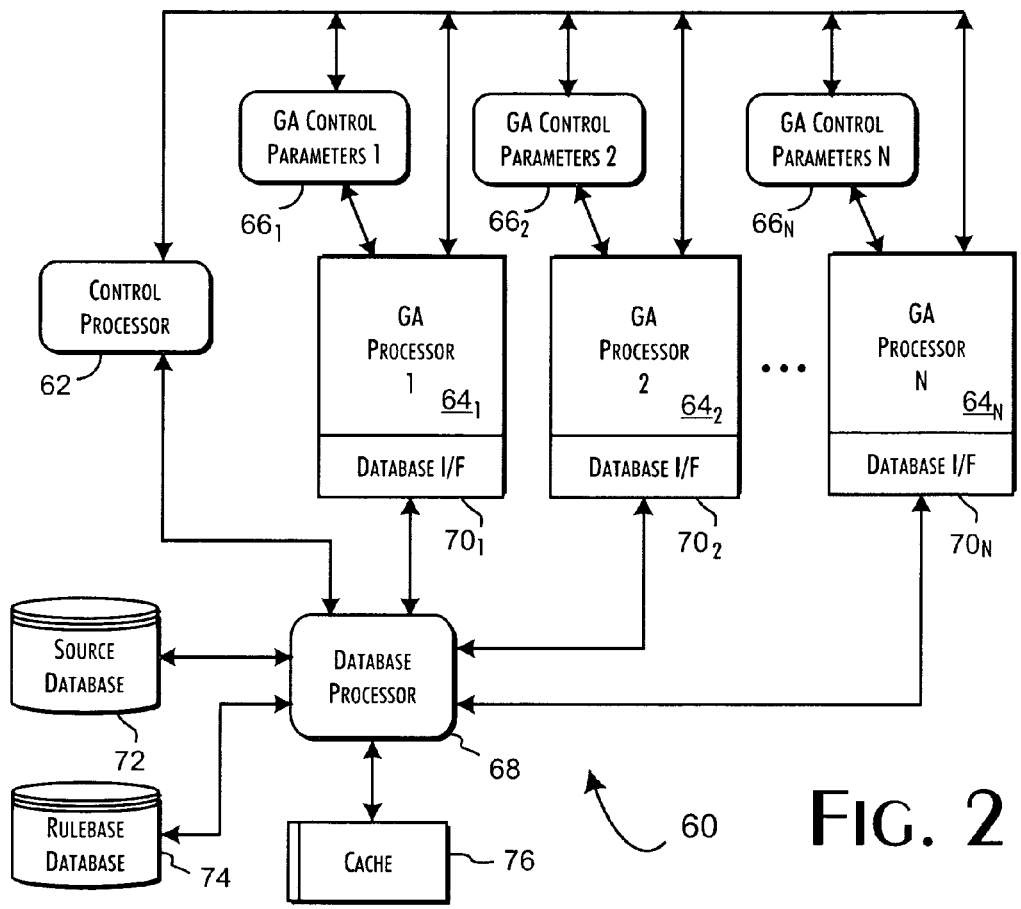
FIG. 2 is a system block diagram of a scalable, multiprocessor computer system demonstrating a fully parallel implementation of the computer-based genetic algorithm of the present invention.

A preferred appliance system implementation 60, including an optional parallel processor configuration, is shown in FIG. 2. A control processor 62 is preferably used to manage, via a network connection, the operation of one or more GA appliance processors $64_{1-N}$. Each GA appliance processor $64_{1-N}$ may be implemented using a headless personal computer, workstation, or mainframe computer platform. Sets of GA control parameters $66_{1-N}$ are preferably maintained either on the control processor 62 or distributed on the GA appliance processors $64_{1-N}$ to maintain control parameters, including the analysis parameters 16, specific to each of the GA appliance processors $64_{1-N}$. A database processor 68, preferably implementing a conventional SQL-based database management system, is accessible via database interface clients $70_{1-N}$ implemented on the GA appliance processors $64_{1-N}$. The database processor 68 provides managed access to a source database 72, providing storage for source data sets 12, and a rulebase database 74, providing storage for persistent copies of the cached contents of rulebase caches 44. The database processor 68 preferably implements a cache 76 sized sufficient to store working portions of the genome cross-matrix table 18 and rulebases 44 for the instances of the genetic algorithm architecture 10 concurrently executed by the GA appliance processors $64_{1-N}$. The database processor 68 is preferably accessible from the control processor to enable reporting of solution sets and further analysis of persistently stored rulebase cache data.

For a minimal implementation, the functions of the control processor 62, a GA appliance processor $64_1$, and database processor 68 can be combined and implemented on a single hardware platform. Alternately, the functions of the control processor can be integrated into a business information system and the remaining functions of the genetic algorithm architecture implemented as business objects in a larger data mining or data analytics system.

Figure 3:
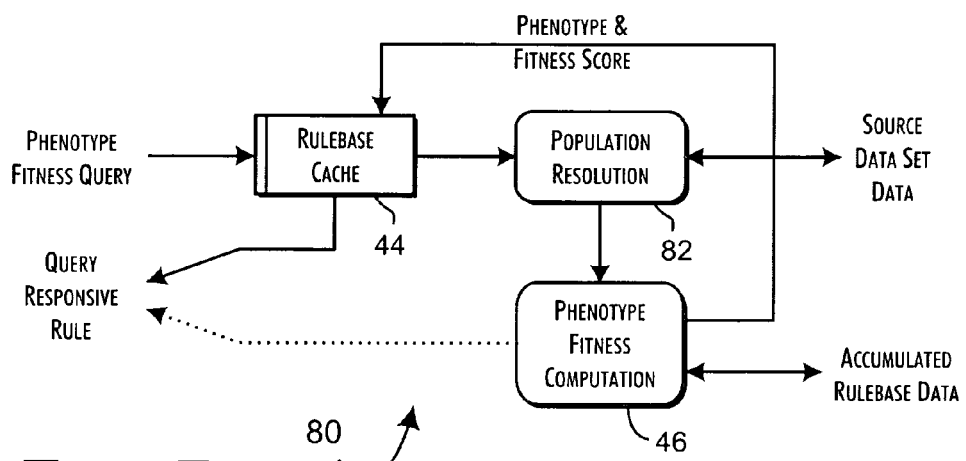
FIG. 3 is a detailed block diagram of a preferred implementation of the rulebase cache subsystem used by the present invention.

A preferred implementation of the rulebase cache subsystem 80 is shown in FIG. 3. A phenotype fitness query, as issued from a GA appliance processor $64_{1-N}$, is resolved by the database processor 68 against the rulebase cache 44, preferably as entirely held within the cache 76. Where a phenotype matching rule exists within the rulebase cache 44, the rule is returned. Where a matching rule does not exist, the database processor 68 may automatically, by way of a database stored procedure 82 or the like, determine whether the queried phenotype exists as a member of the corresponding population data set 12 held by in the source database 72. Based on the existence of the phenotype within the population data set 12, the requesting GA appliance processor $64_{1-N}$ performs the phenotype fitness computation 46 and returns the resultant rule to the database processor 68 for storage in the rulebase cache 44 and, further, to the rulebase database 74.

Figure 4:
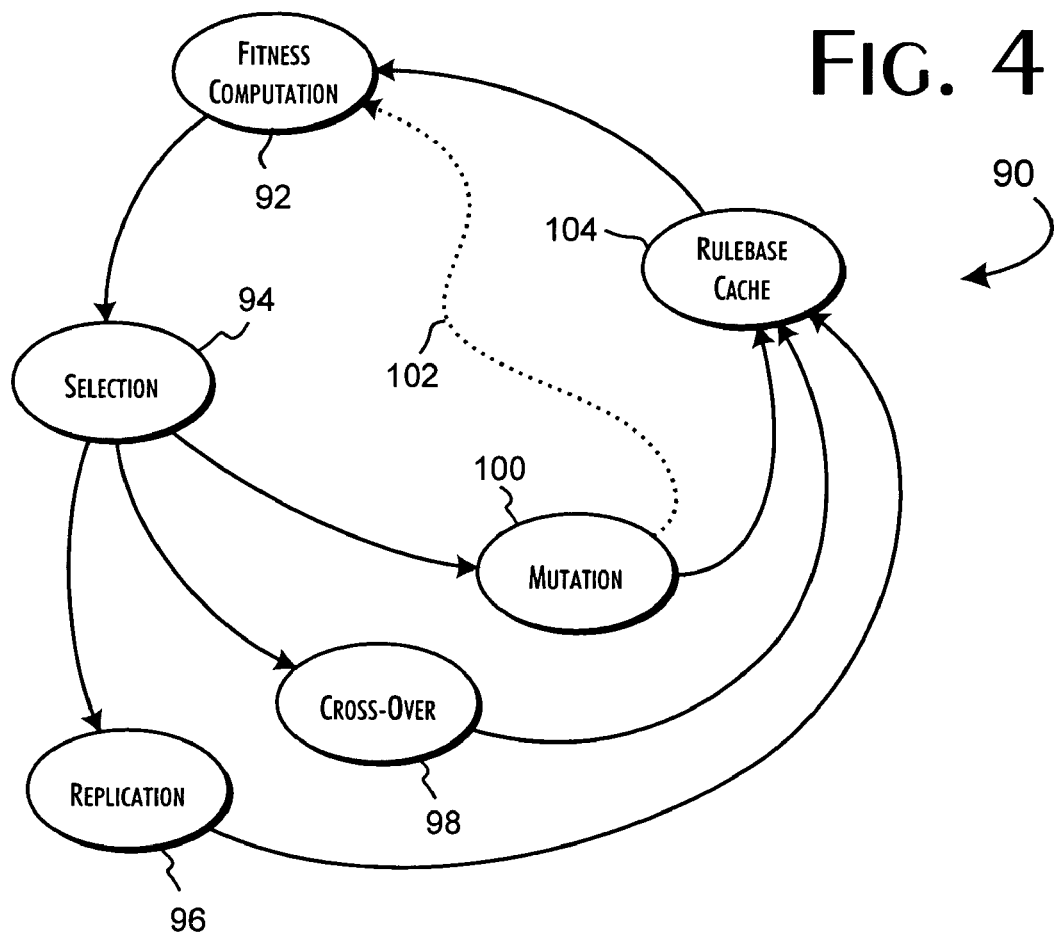
FIG. 4 provides a process flow diagram illustrating the competition and recombination processes of a genotype completion stage and further illustrating lossless knowledge recapture through the mutation operator in accordance with a preferred embodiment of the present invention.

The top-level process flow 90 implemented in a preferred embodiment of the genetic algorithm architecture 10 is shown in FIG. 4. In accordance with the present invention, the first stage completion loop 20 implements a GA-type competition between field groups essentially separate from a consideration of underlying phenotypes. While the fitness computation 92 derives field group fitness scores from the second stage phenotype completion loop 36, which involves a separate competition between phenotypes, the resulting fitness scores are resolved, by genotype reduction 54, to be specific to the genotypes represented by the individual field groups. Selection 94 is thus performed on the fitness qualifications of the genotypes.

Recombination by replication 96, cross-over 98, and mutation 100 is also performed against genotype fields. Replication 96 merely copies selected field groups. Mutation 100 produces field groups with randomly substituted fields, thereby creating new field groups relative to the parent population set of genotypes.

The preferred cross-over 98 operator implements a randomized non-field biased cross-over in addition to standard GA single-point cross-over. The cross-over rate factor determines the subset of field groups selected for cross-over. Nominally, single-point cross-over is then performed for selected pairs of field groups at a randomly selected point between fields along the length of the field groups. Preferably, a sub-selection of the cross-over selected field groups, as further determined by a randomized cross-over rate factor, are instead subjected to randomized non-field biased cross-over. In performing randomized non-field biased cross-over, the individual fields of sub-selected field group pairs are selected for swap using a uniform probability random choice function. The resulting cross-over produces a pair of field groups with mixed combinations of the fields occurring in their parental field groups without field-linkage bias.

In conventional genetic algorithms, recombination produces a new current population of phenotypes that is then directly subjected to generational competition, as generally indicated by the dashed line 102. In accordance with the present invention, the substantive content represented by the new current population of genotypes is effectively externalized and preserved 104 in the rulebase cache through the operation of the second stage phenotype completion loop 36. This functional externalization facilitates parallel access to the knowledge developed within instances of the genetic algorithm architecture 10. Furthermore, the knowledge base persisted in the rulebase cache represents a knowledge constrained to phenotypes that actually exist within the source population data set and is therefore valid within the applied domain of the source population data set. Rules produced by any of the GA appliance processors $64_{1-N}$, given a common fitness model instance, are usable by any of the GA appliance processors $64_{1-N}$.

The principal constraints on the parallelization of the GA appliance processors $64_{1-N}$ are therefore the storage size and access bandwidth of the cache 76. Since rule validity is equally independent of the generation of production, there is no restriction on the ordering of cached rule reads and writes as between the different GA appliance processors $64_{1-N}$. In a preferred embodiment of the present invention, the rulebase cache as effectively maintained within the cache 76 is simply optimized for rule reads with priority given to rule writes independent of the GA appliance processors $64_{1-N}$ that source the read and write requests. Consequently, the hardware performance of paralleled GA appliance processors $64_{1-N}$ will scale nearly linearly with the number of processors provided.

Figure 5:
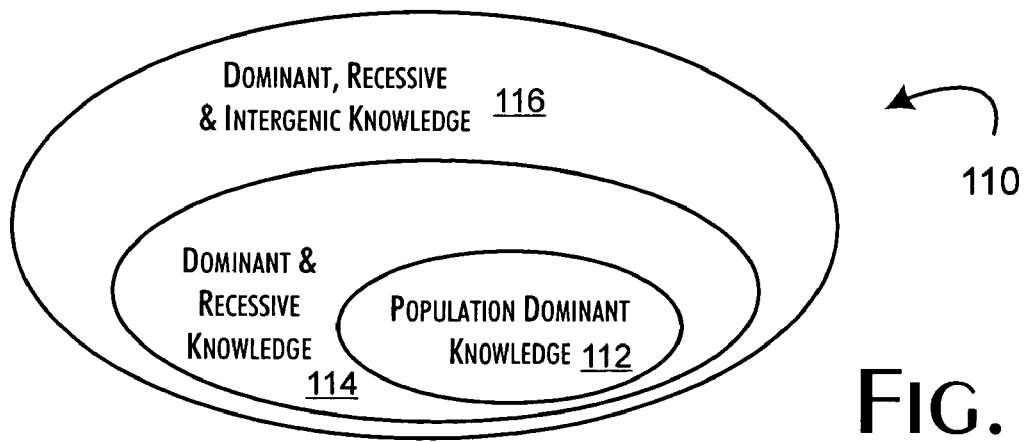
FIG. 5 provides a knowledge space representation of the benefit obtained by use of the lossless knowledge recapture mutation operator in accordance with a preferred embodiment of the present invention.

In accordance with the present invention, the preservation 104 of rules in the rulebase cache also enables a new knowledge preservation mode. As generally represented in FIG. 5, conventional genetic algorithms support knowledge representation through a diploid dominant and recessive field encoding scheme. A dominant knowledge space 112 represents the fields and attributes that directly contribute to the determination of an optimal solution. A larger space 114 effectively represents additional knowledge preserved through the existence of recessive fields held in abeyance. Recessive fields are capable of preserving meaningful knowledge through transient evolution of the current population data set.

Knowledge in conventional genetic algorithms is entirely lost where, through progressive recombination, a field attribute is eliminated from the current population data set. Further, the entire field is lost when the last field/attribute pair is lost. Conventionally, the GA mutation operator is intended to randomly introduce field/attribute pairs and thereby create the potential of recovering prematurely lost knowledge. To be effective, as a practical matter, the mutation rate must be set sufficiently high to support an adequate rate of innovation and to reduce the potential for premature convergence. While higher mutation rates may be desired to accelerate knowledge recapture, increased mutation has the negative effect of disrupting the otherwise progressive adaptation of the current population data set and slowing ultimate convergence to an optimal data set.

In the case of the present invention, the preservation 104 of both field and attributes in the rulebase cache 44, even where the fields and attributes are no longer represented in the current population data set 112, 114, effectively adds what may be analogized as an intergenic rules component to the knowledge space 116 maintained by the present invention. Rules for the sets of phenotypes corresponding to genotypes that existed within but are no longer a part of the current genotype population data set remain stored in the rulebase cache 44. In the genetic algorithm architecture 10 of the present invention, a mutation 100 substitutes a new field into a given field group. Where the resulting genotype represents a reintroduction of a prior lost genotype, the mutation equally restores all of the matching phenotypes. The full knowledge represented by the restored genotype is equally restored. Consequently, the present invention need not rely on a high rate of mutation to progressively restore specific prior lost field/attribute pairs that may yet be significant to identifying an optimal set. Instead, the mutation operator 100 need only operate at a rate sufficient to restore prior lost genotypes that contain optimally significant phenotypes. The reduction in required mutation rate is inversely proportional by the density of genotypes within the source population data set while being substantially independent of the phenotype size of the source population data set.

Additionally, the restoration of a prior lost field and therefore the corresponding genotype can net a substantial performance improvement in implementations of the genetic algorithm architecture 10. With the restoration of a field, all of the corresponding prior considered phenotypes become available for selection as a function of the phenogenesis operator 38. Since the phenotypes are stored within rules, significant numbers of prior computed phenotype fitness scores can become immediately available for access from the rulebase cache 44. In practical effect, a potentially substantial body of prior evaluated knowledge is losslessly restored from outside of the knowledge space represented just by the current population data set.

Figure 6:
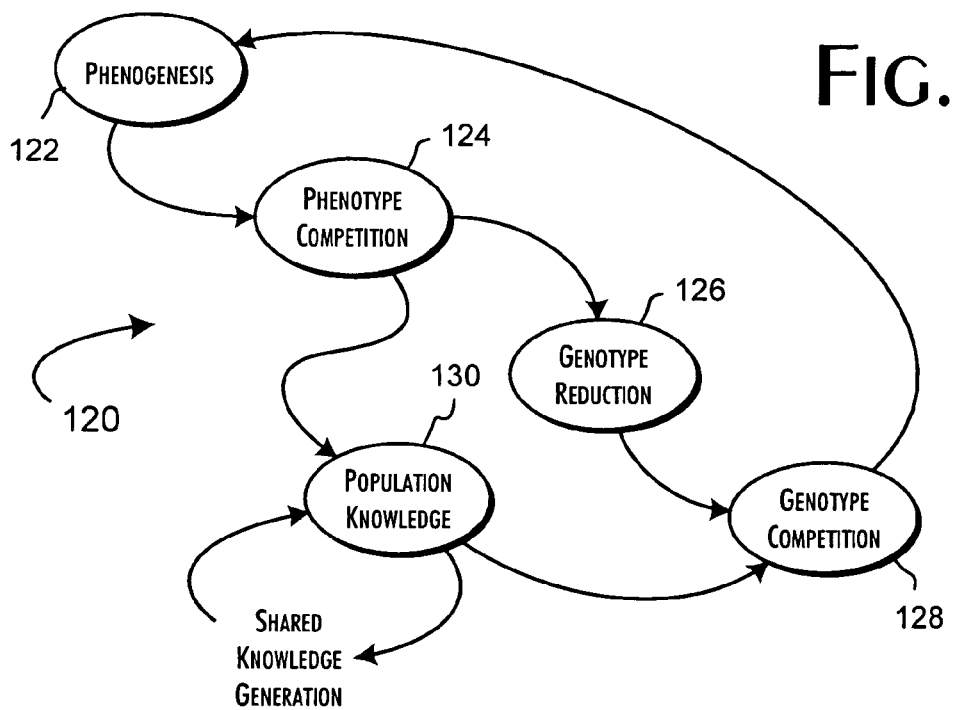
FIG. 6 provides a process flow diagram illustrating operation of the two-phase completion genetic algorithm architecture as implemented in a preferred embodiment of the present invention.

The functional operation 120 of the second stage completion loop 36 in relation to the first stage completion loop 20 is generally illustrated in FIG. 6. In accordance with the present invention, phenogenesis 122 drives a broad, randomized, yet high-speed search of the phenotype space within the source population data set. The scope of phenogenesis-based competition 124 is, however, linked to and constrained by the actual source population data set and the current population of genotypes being analyzed in the first stage completion loop 20. The combination of phenogenesis 122 and phenotype competition 124 is therefore a targeted or bound, and thereby intrinsically stable operation.

Genotype reduction 126, in accordance with the present invention, effectively segregates phenotype details from the first stage completion loop 20 by compiling phenotype fitness scores into representative genotype fitness scores. The highly desired result is that the first stage completion loop 20 functions entirely as a genetic competition between field groups. Consequently, the performance limits of the first stage genetic competition are predominantly dependent on the number of different genotypes within the source population data set rather than on the phenotype size of the source population data set. The genetic algorithm architecture 10 is therefore able to handle a number of potentially relevant fields and a total source population data set size many orders of magnitude greater than conventional genetic algorithm systems. A typical single CPU Pentium™-class personal computer can readily analyze a population data set defined by 50 to 75 fields with a phenotype set size that is, depending on the phenotype size factor parameter, some 2000 times larger than the phenotype population that can be managed by a conventional genetic algorithm on comparable hardware. Furthermore, the increased analysis scope is obtained without loss of precision in the phenotype knowledge, since all phenotype rules are persisted 130.

Figure 7:
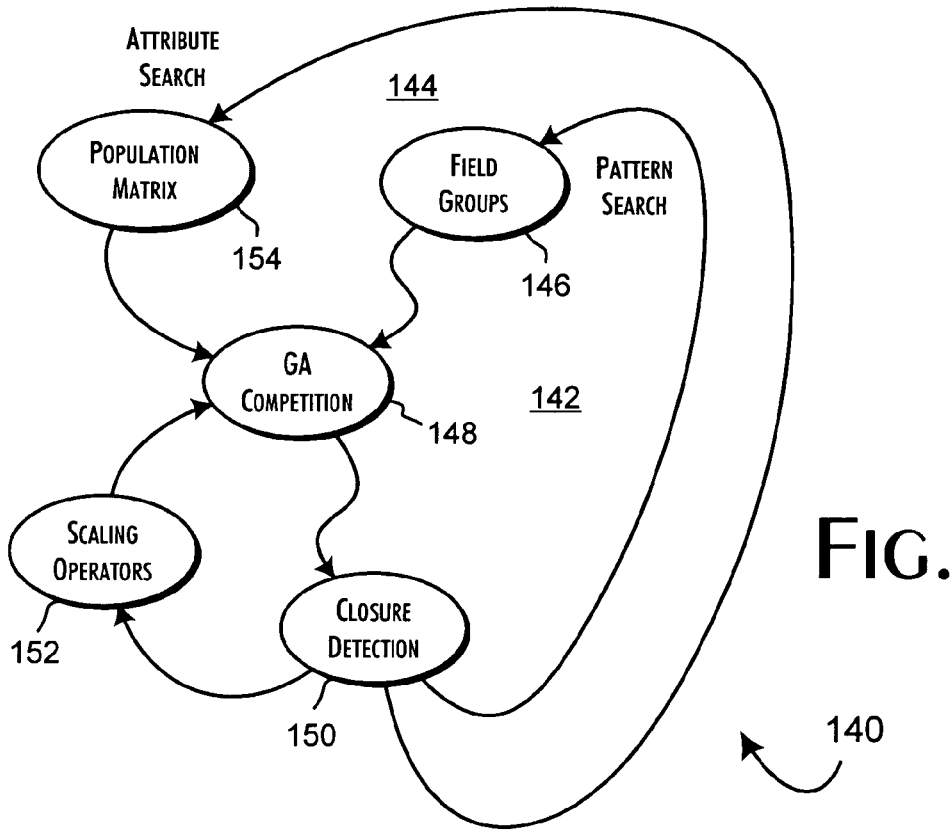
FIG. 7 provides a process flow diagram illustrating the efficient linkage learning operation as achieved in a preferred embodiment of the present invention.

The effective linkage learning operation 140 implemented by the genetic algorithm architecture 10 is illustrated in FIG. 7. In accordance with the present invention, the first stage completion loop 20 effectively implements a discrete pattern search 142 while the second stage completion loop 36 functionally implements attribute search. The iterative subjection of field groups 146 to genetic competition 148 tends to resolve the current population of field groups towards a stable set. The recurrent phenogenesis, based on the available population field/attribute matrix 154 is focused by the pattern search progression and thereby concurrently progresses toward identifying the most fit phenotypes for the current genotype population. Operator scaling 152, including adjusting mutation rates for pattern search 142 and amplification of the differences in phenotype fitness scores for attribute search 144, functions to interoperatively adjust the gain of the pattern search and attribute search loops 142, 144. Scaling adjustments that maintain stability for one loop therefore tend to be stable for both loops 142, 144. Consequently, the genetic algorithm architecture 10 of the present invention achieves concurrent pattern and attribute search that progressively resolves to an identification of an optimal solution set. Notably, this linkage learning is achieved without resort to an artificial genetic system to fully achieve the performance and efficiency gains conventionally theorized to occur with linkage learning. Rather, the present invention implements a representation of an intergenic knowledge storage system to retain and permit ready restoration of knowledge otherwise lost from current population data sets.

Thus, systems and methods for implementing high performance data analysis through the application of a two-stage completion genetic algorithm architecture has been described. While the present embodiments have been described in terms of the processing and analysis of population data, such data is to be understood to represent, consistent with the usage of the term in the field of genetic algorithms, any complex data set representable as sequences of characteristics and attributes or fields and values. Population data sets are readily understood to include financial transaction histories, drug interaction trail histories, epidemiological study data, and other data sets that encode complex, multivariate relations.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A computer system implementing a genetic algorithm computing architecture for processing population data to determine an optimal solution determined according to a predefined population fitness model, said computer system comprising:
  a) a source database storing a source population data set; and
  b) a processor coupled to said source database to read population data set data, wherein said processor implements a two-stage completion genetic algorithm with respect to a current population data set, said two-stage completion genetic algorithm including:
    i) a genotype completion loop, including a phenogenesis operator, wherein genotypes of said current population data set are competed based on genotype field fitness scores, said genotype completion loop providing for a cyclic revision of said current population data set; and
    ii) a phenotype completion loop, including a genotype reduction operator, wherein a current phenotype set is generated by said phenogenesis operator relative to said current population data set, wherein a fitness operator evaluates a predetermined fitness function against each phenotype of said current phenotype set to produce phenotype fitness scores, wherein said genotype reduction operator determines genotype fitness scores from phenotype fitness scores, and wherein said processor includes a reporting subsystem coupled to receive and output said current phenotype set as a solution set.

2. The computer system of claim 1 further comprising a rulebase providing for the storage of phenotype data tuples wherein each phenotype data tuple includes a field group including a plurality of field and value pairs and a field group fitness score, wherein said processor is coupled to said rulebase to read and write said phenotype data tuples, wherein said genotype reduction operator utilizes said rulebase as a cache accessible by a field group identity function, and wherein selected field group fitness scores are returned as phenotype fitness scores.

3. The computer system of claim 2 wherein said genotype reduction operator determines a phenotype fitness score for a predetermined phenotype of said current phenotype set provided said predetermined phenotype is present in said source population data set.

4. The computer system of claim 3 wherein said processor further includes a genome cross matrix operator including a table of field and value pairs, wherein said table is accessible by said phenogenesis operator, and wherein said genome cross matrix operator populates said table with each field and value pair occurring within a genome defined by said source population data set.

5. The computer system of claim 4 wherein said genotype reduction operator implements a truncation function to select subsets of phenotype data tuples for given genotypes from which to compute genotype fitness scores respectively for said given genotypes.

6. The computer system of claim 5 wherein said genotype completion loop includes a genotype based recombination operator, and wherein said genotype completion loop implements a proportional selection function, responsive to genotype fitness scores provided from said genotype reduction operator, to allocate genotypes of said current population data set to said recombination operator.

7. The computer system of claim 6 wherein said rulebase is accessible by a plurality of said processors to read and write said phenotype data tuples.

8. The computer system of claim 2 wherein said rulebase provides a persistent store of phenotype data tuples generated in said phenotype completion loop irrespective of whether the phenotype data tuples are represented by genotypes of said current population data set and wherein phenotype data tuples represented by genotypes absent from said current population data set remain accessible from said persistent store of phenotype data tuples within the performance of said phenotype completion loop.

9. The computer system of claim 8 wherein said genotype completion loop further includes a mutation operator that functions to include a generated genotype, absent from a prior iteration of said current population data set, in said current population data set, and wherein phenotype data tuples corresponding to said generated genotype are readable by said processor in performance of said phenotype completion loop.

* * * * *